United States Patent
Frick

[11] 3,800,413
[45] Apr. 2, 1974

[54] DIFFERENTIAL PRESSURE TRANSDUCER
[75] Inventor: Roger L. Frick, Minneapolis, Minn.
[73] Assignee: Rosemount Inc., Minneapolis, Minn.
[22] Filed: July 26, 1971
[21] Appl. No.: 164,861

Related U.S. Application Data
[62] Division of Ser. No. 869,657, Oct. 27, 1969, Pat. No. 3,618,390.

[52] U.S. Cl. ............................ 29/592, 73/398 C
[51] Int. Cl. ...................... H04r 31/00, G011 9/12
[58] Field of Search .......... 29/593, 594, 595, 472.9, 29/434, 454, 463, 499, 503, 631, 592; 73/398 R, 398 C, 406, 407, 408, 398 AR; 317/246

[56] References Cited
UNITED STATES PATENTS
| | | | |
|---|---|---|---|
| 2,999,385 | 9/1961 | Wolfe | 73/407 R |
| 3,027,769 | 4/1962 | Coon | 317/246 |
| 2,999,386 | 9/1961 | Wolfe | 73/407 R |
| 3,557,621 | 1/1971 | Ferran | 73/398 C |
| 3,479,879 | 11/1969 | Music | 73/398 C |
| 2,667,786 | 2/1954 | Spaulding | 317/246 |

*Primary Examiner*—Charles W. Lanham
*Assistant Examiner*—D. C. Crane
*Attorney, Agent, or Firm*—Dugger, Johnson and Westman

[57] ABSTRACT

A differential pressure transducer of the capacitor type utilizing isolation diaphragms for sensing the differential pressure directly, and having a central chamber with a sensing diaphragm in the central chamber. The central chamber is filled with oil or a suitable liquid which transmits pressure from the isolation diaphragms to the sensing diaphragm. The sensing diaphragm forms a capacitor plate, and the walls of the chamber adjacent to the sensing diaphragm also form capacitor plates. The pressures are transmitted to the sensing diaphragm through the oil so that only differential pressure is sensed between the two isolation diaphragms. The sensing diaphragm and its chamber are made so that any excessive pressure causes the sensing diaphragm to bottom out against its mounting chamber surfaces. The unit is made extremely stable, by using a relatively massive metal housing with a glass center portion fused thereto, and depositing the metallic capacitor plate material right onto the glass surfaces which form the sensing chamber.

4 Claims, 5 Drawing Figures

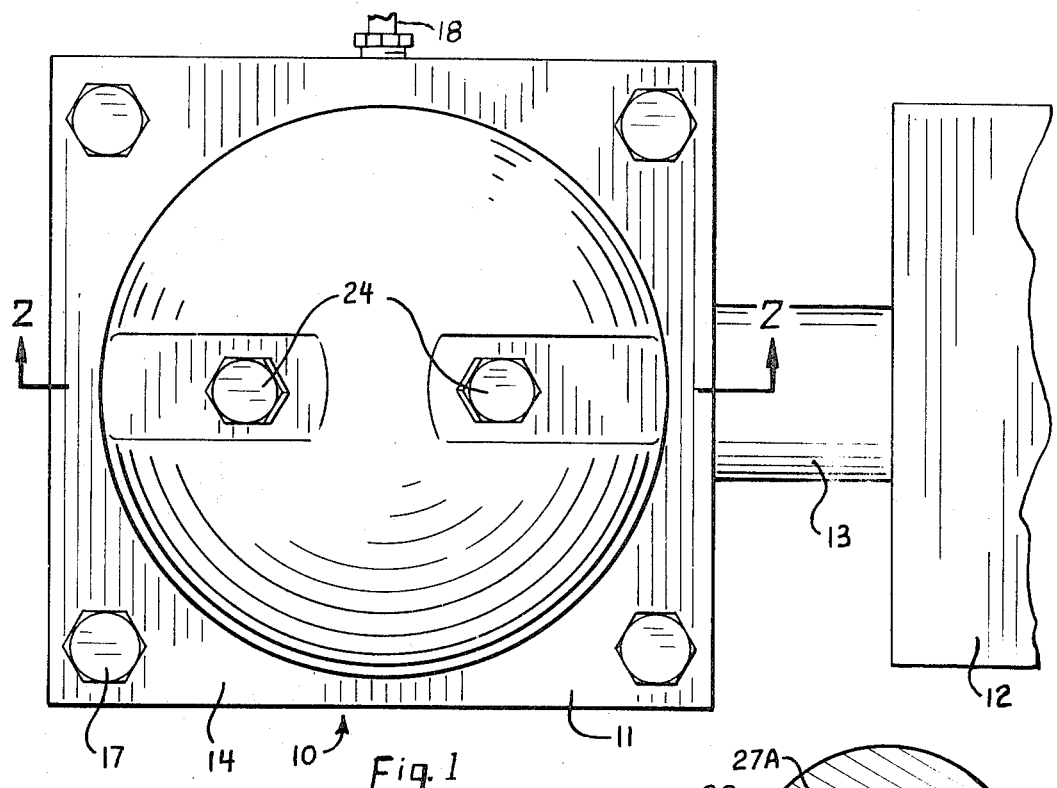
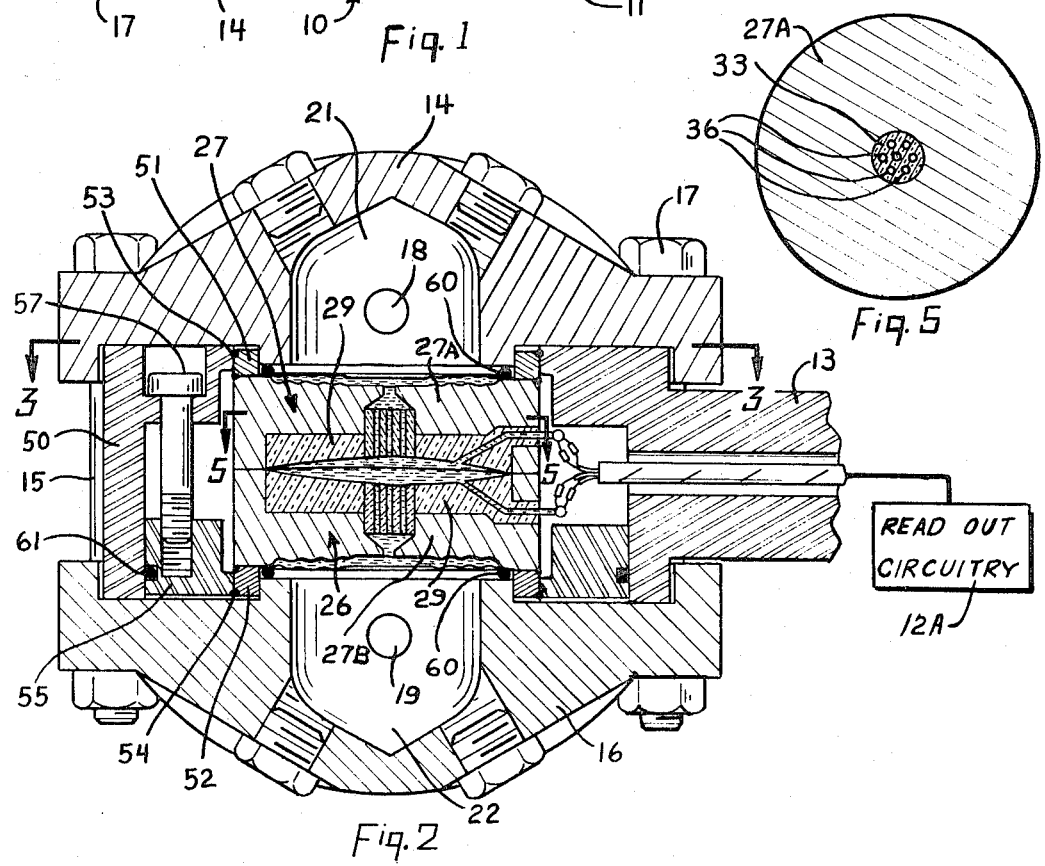

DIFFERENTIAL PRESSURE TRANSDUCER

This application is a division of my copending application, Ser. No. 869,657, Filed Oct. 27, 1969 now U.S. Pat. No. 3,618,390.

BACKGROUND OF THE INVENTION

1. Field of the Invention

The present invention relates to differential pressure transducers which are of the capacitive type.

2. Prior Art

U.S. Pat. No. 3,232,114 shows a differential pressure transducer of the capacitive type wherein the fluid which is being sensed for pressure acts directly upon a capacitive sensing diaphragm. This does not show the use of isolation diaphragms which contact the fluid to be measured for pressure or the use of a liquid to transmit the pressure to a sensing diaphragm. U.S. Pat. No. 3,342,072 also shows a type of pressure measuring device which utilizes a liquid filled chamber, but which has a different construction of the sensing units. Other U.S. patents which disclose differential sensing capabilities include U.S. Pat. Nos. 3,295,326; 3,350,945; 3,372,594; 3,258,971 and 3,158,000.

None of these structures embody the features of the present device which includes capacitive sensing with the capacitor plates isolated from the fluid being sensed, positive overpressure protection, and very stable sensing characteristics.

SUMMARY OF THE INVENTION

The present invention relates to a pressure transducer using capacitive sensing with one portion of the capacitor formed by depositing a metal layer onto a glass or ceramic surface fused to a large metal housing. A differential pressure transducer for sensing differential pressures between two sources of fluid and which isolates the fluid from the sensing portion of the unit is shown. The transducer is provided with isolation diaphragms, and there is a liquid transferring pressure from the isolation diaphragms to the opposite sides of a measuring or sensing diaphragm so that any pressure on one isolation diaphragm different from the pressure on the opposite isolation diaphragm will cause the sensing diaphragm to move relative to sensing capacitive plates. Overpressure capabilities are provided by designing the unit so that the measuring diaphragm will bottom out and be supported against the walls forming its chamber when subjected to overpressure, and where the chamber housing itself is very stable to prevent shifts in calibration when the unit has bottomed out. The unit is designed so that full scale deflection is only a few pounds per square inch, while the unit will withstand differential overpressures of several thousand pounds per square inch without major shifts in calibration.

It is therefore an object of the present invention to present a stable differential pressure transducer which is easy to make, economical in operation and remains accurate even after being subjected to large overpressures.

The invention further includes the concept of making a pressure sensor which uses an isolation diaphragm, a liquid to transfer pressure to a sensing diaphragm, and a mechanical stop for the sensing diaphragm which stops the sensing diaphragm from movement before the isolation diaphragm is mechanically stopped.

BRIEF DESCRIPTION OF THE DRAWINGS

FIG. 1 is a top plan view of the pressure transducer capsule utilizing a sensor made according to the present invention;

FIG. 2 is a sectional view taken as on line 2—2 in FIG. 1;

FIG. 5 is a fragmentary sectional view taken as on line 5—5 in FIG. 2.

DESCRIPTION OF THE PREFERRED EMBODIMENT

Figure 3:
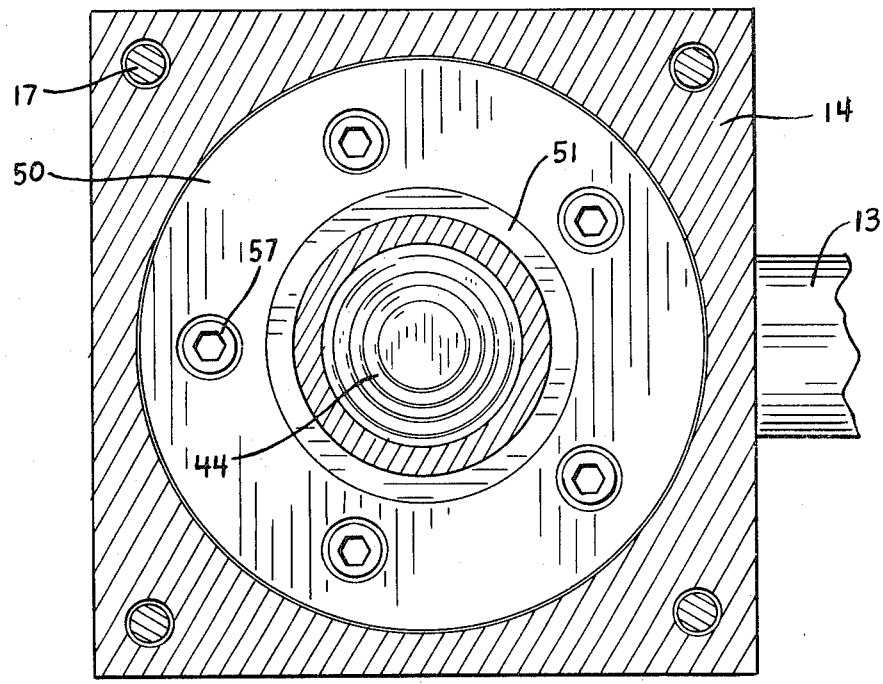
FIG. 3 is a sectional view taken as on line 3—3 in FIG. 2.

A differential pressure transducer assembly unit indicated generally at 10 includes a main pressure transducer housing 11, and a sensing electronic circuitry housing shown fragmentarily at 12. The circuitry is shown schematically at 12A. The two units are connected together with a connecting element 13. The pressure transducer housing, as shown, includes a first end cap 14, a center housing section 15, and a second end cap 16 which are fastened together in an assembly with suitable cap screws 17. Suitable conduits 18 and 19, respectively, open into the end caps. End cap 14 has an interior chamber 21 centrally located therein and the end cap 16 has an interior chamber 22. The conduit 19 opens to chamber 22 and the conduit 18 opens to chamber 21. The sources of fluid to be sensed are connected to the respective conduits and differential between the pressures of these two fluids will be sensed in the center housing section 15. The fluids can be gaseous or liquid and may be highly corrosive, without damaging the sensing unit.

As shown, the end caps are hemispherically shaped, and the interior chambers are circular in cross section and have a domed upper surface. Suitable passageways containing plugs 24 are provided for purposes of bleeding the chambers, or for servicing.

Figure 4:
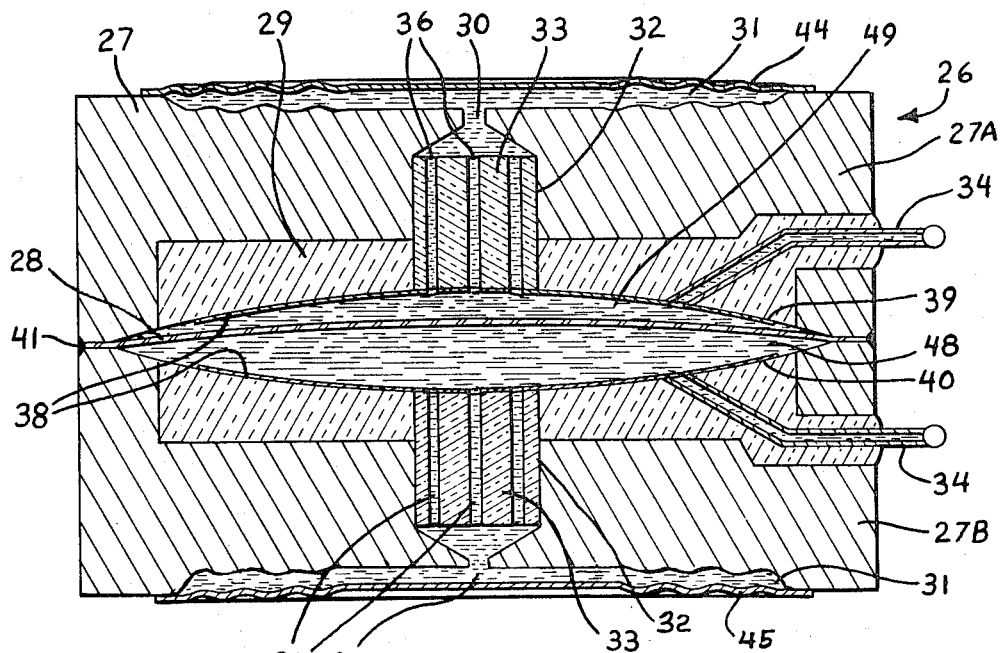
FIG. 4 is an enlarged sectional view of the sensing diaphragm and isolation diaphragms of the present invention.

Center housing section 15 mounts the interior sensing cell assembly 26 which is also shown in detail in FIG. 4. The interior sensing cell assembly includes a large metal housing 27 that in initial stages of manufacture is made into two sections 27A and 27B divided along a parting line where a measuring or sensing diaphragm 28 is placed. The metal member halves 27A and 27B have cup-like circular cross section cavities 29, which are filled with a rigid insulation such as glass or ceramic material. The glass, which is used in the form disclosed, is placed into cavities 29 and fused to the metal walls of sections 27A or 27B in a furnace. Besides the main glass filled cavities 29, the sections each have a central passageway 32, and an opening 30 which open to a depression or shallow cavity 31 on the opposite side of each housing section from the glass filled cavities 29. Each opening 30 communicates with its corresponding passageway 32. A separate ceramic tube 33 having a plurality of axially extending openings 36 is placed into each of the passageways 32 and the ceramic tubes extend into the cavities 29. The ceramic tubes are positioned in the cavities before the glass is fused, and the tubes 33 are fused in place. Small metal tubes 34 are placed through provided openings in the wall of each of the sections of the housing 27 and extend into the cavities 29. The tubes 33 and 34 actually extend out beyond the edges of the sections 27A and 27B initially so they extend out beyond the glass after the cavities 29 have been filled and fused. Note that the glass insulates the metal tubes 34 where they pass out through the side walls of the housing sections.

Then each section of the housing is ground off and a concave surface which is, in part, substantially spherical indicated at 38 is ground into the glass in the cavities. The tubes 33 and 34 are ground off at the same time so that the tubes form a continuation of the concave surface. Then the surfaces 38 of the unit are each covered with a thin metal coating. These are indicated at 39 and 40, respectively, and form capacitor plates when assembled. The depth of each concavity is shown greatly exaggerated and typically is between 0.003 and 0.010 inches as measured at the center, where the depth is maximum relative to the edge. The diameter of the diaphragm 28 is typically between 0.3 and 3.0 inches. The thickness of insulating section 29 is typically greater than 0.10 inches in order to maintain sufficiently low shunt capacitance between electrodes subsequently formed at surfaces 38 and metal case 27.

The diameter of passageway 32 is typically in the order of 0.2 inches and passageways 36 may be 0.020 inches for example. These passageways must be sufficiently small so that diaphragm 28 is not overly stressed by the presence of those openings when the diaphragm is subjected to maximum overpressures.

The passageways which extend between the cavities 31 and the concave surfaces 38 in each of the housing sections may be formed after the glass has been fused into place in the housing. If desired such passageways could be formed by a suitable drilling means or the like subsequent to the fusing step.

In construction, when the two sections 27A and 27B have been prepared as described, the metal diaphragm 28 is then placed between the sections, stretched taut and is welded into place with a continuous bead weld 41 which joins the two sections 27A and 27B together and holds the diaphragm under a desired amount of stress. The weld 41 also hermetically seals the chambers on the interior of the housing.

First and second isolation diaphragms 44 and 45, respectively, are then welded into place around the peripheries of the depressions or cavities 31 in each of the housing sections. As can be seen, the isolation diaphragms are made of thin stainless steel and are corrugated so they will flex easily.

When assembled, the sensing diaphragm and the isolation diaphragms divide the sensing unit 26 into two completely sealed sensing chambers comprising a first chamber 48 and a second chamber 49. The sensing chambers 48 and 49 are filled with a liquid, which may be a silicone base oil, through their respective tubes 34 which lead into the chambers. After filling, the tubes 34 are sealed at their outer ends. The chambers 48 and 49 are open through the holes 36 in the ceramic tubes 33 to the holes 30 in the sections 27A and 27B, respectively, and then into the cavities 31 defined in the outer surfaces of the metal cups or sections 27A and 27B underneath the respective diaphragms 44 and 45. The diaphragms 44 and 45 are welded all the way around their edges so that this is a completely sealed unit and the diaphragms form walls of isolation chambers in cooperation with the cavities 31. When the pressures in chambers 21 and 22 are equal, the measuring diaphragm 28 will extend substantially straight across the parting line between the two sections of the metal housing 27.

The oil in chambers 48 and 49 is put in through the filler tubes 34 until the desired volume of oil in each of the sections is reached and the tubes 34 are sealed off. The metal tubes 34 are then used for leads to the respective capacitor plates 39 and 40 and are connected to suitable readout circuitry. The lead to the sensing diaphragm 28 can be fixed to the metal housing as the diaphragm is welded to the housing and the capacitor plates 39 and 40 are insulated from the housing.

In order to keep the pressure from the cap screws 17 off the sensing cell assembly, a unique way of retaining the center sensing cell is utilized. A massive ring 50, which also includes the connecting portion 13 as a unit assembly, is utilized and this has a large center opening, as shown, into which the sensing cell assembly 26 will fit. A pair of annular rings 51 and 52, respectively, are welded onto the outer edges of the housing sections 27A and 27B and surround the respective isolation diaphragms 39 and 40. In turn, the ring 51 is welded as at 53 to an interior surface of the massive ring 50. A retainer ring 55 which surrounds the sensing cell 26 and fits into a provided cavity in the ring 50 is held in place through the use of cap screws 57 that pass through provided openings in a shoulder portion of the ring 50 adjacent to the ring 51. The cap screws 57 are threaded into the ring 55. The ring 55 is welded as at 54 to the annular ring 52. The pressure on the center section is controlled by the cap screws 57. However, the outer edge portions of the ring 50 are of greater axial length than the rest of the clamping assembly and these outer portions bear against surfaces of the end caps 14 and 16 so that when the screws 17 are tightened, the force from the screws 17 is taken by the ring 50 and is not transmitted to the center cell assembly 26. It should also be noted that suitable "0" rings 60 are provided between the end caps 14 and 16 and housing 27. There is also an "0" ring 61 provided between the outer periphery of the ring 55 and the inner periphery of the cavity on the large ring 50 that the ring 55 slips into. This provides for a seal in both instances.

The cavity volumes in the isolation and sensing chambers are selected so that the sensing diaphragm 28 will bottom before the acting isolation diaphragms 44 or 45 will bottom against the surface defining depressions 31. This means that the bottoming action, for example, if pressure is acting on the diaphragm 45, will be against capacitor plate 39 with the measuring diaphragm 28 resting against this capacitor plate before the isolation diaphragm 45 bottoms against the surface of the housing. This insures that the overpressure stop will be positive, and because the deposited capacitor plates 39 and 40 are very stable due to the massive amount of glass fused onto the housing 27, there is no shift in calibration and the unit is not damaged in any way. This same concept of overpressure protection can be used in a pressure sensor which actually senses only one pressure but uses an isolation diaphragm.

All of the bubbles are removed from the oil at the time it is placed in the chambers and before the tubes 34 are sealed. The isolation diaphragms can be stainless steel and have to be compatible with the fluid being sensed through the conduits 18 and 19. The sensing diaphragm itself needs only be compatible with the relatively inert oil or other liquid used for filling the respective chambers 48 and 49. The diaphragm 28 and the housing 27 usually are of the same material to be compatible. The capacitor plates 39 and 40 which are deposited on the glass surface forming the interior sensing chambers 48 and 49 can be nickel or any desired metal. The capacitor plates are relatively thin and form electrical contact with the walls of tubes 34, but are spaced from the metal housing 27.

The glass in the cavities 29 is fused to the surfaces of the housing. It is important that the glass remains under compression while it is cooling to prevent shattering. There are no friction or sliding members since the glass fills the housing cavity and the capacitor plates are deposited right on the glass. This construction provides a stable assembly which withstands extremely high pressures of both short and long duration without significant effect to the instrument's calibration.

One of the problems in capacitive type sensors having an oil filling between isolation diaphragms and the sensing diaphragm, as shown, is the expansion of the oil due to temperature changes. This is the reason for having the measuring or sensing diaphragm bottom out. Thus oil expansion will not affect the pressure at which the diaphragm 28 will bottom out therefore protecting against overpressure damage even if the oil has expanded because of increased temperatures. If the overpressure protection was dependent upon the isolation diaphragms 44 or 45 bottoming out, and the oil expanded, the overpressure stop point could change enough to cause damage to the sensing diaphragm before the isolation diaphragms had bottomed out.

Sensing or readout circuitry usable with the device of the invention can be such as that shown in my patent for TRANSDUCER CIRCUITRY FOR CONVERTING A CAPACITANCE SIGNAL TO A DC CURRENT SIGNAL, U.S. Pat. No. 3,646,538.

What is claimed is:

1. A method of constructing a pressure sensing cell assembly of the capacitor type including the steps of providing massive metal housing sections, at least one of said sections having an internal cavity, filling said cavity with an insulation material and fusing said material to the metal surfaces defining said cavity, forming a concave surface in said insulation material after it has been fused to the cavity surface, depositing a layer of electrical conductive material on said concave surface to form a first capacitor plate, enclosing the concave surface with a sensing diaphragm sealed to said one housing section to form a sensing chamber, said sensing diaphragm forming a second capacitor plate, forming a second chamber in said one housing section, closing said second chamber with a second diaphragm, providing fluid passage means between said first and second chambers, and filling said first and second chambers and said fluid passage means with a fluid to transmit pressure on said second diaphragm to said sensing diaphragm.

2. A method of constructing a pressure sensing cell assembly of the capacitor type including the steps of providing massive metal housing sections, each of said housing sections having an internal cavity, filling said cavities with an insulation material and fusing said material to the metal surfaces defining said cavities, forming concave surfaces in said insulation material, providing electrically conductive tubular members opening to said concave surfaces and passing out the walls of said housing sections, depositing a separate layer of electrical conductive material on each of said concave surfaces electrically connected to said tubular members, sealing said sensing diaphragm means to said housing sections to form first and second sensing chambers, said housing sections having isolation chambers defined therein with isolation diaphragm means, providing fluid passage means opening between each of said isolation chambers and a corresponding sensing chamber, filling said isolation chambers, said fluid passage means and said sensing chambers with a fluid through said tubular members, sealing said tubular members after the filling step, and connecting electrical lead means to said tubular members after they have been sealed.

3. A method of constructing a pressure sensing cell assembly of the capacitor type including the steps of providing massive metal housing sections, at least one of said sections having an internal cavity, filling said cavity with an insulation material and fusing said material to the metal surfaces defining said cavity, forming a concave surface in said insulation material after it has been fused to the cavity surface, depositing a layer of electrical conductive material on said concave surface to form a first capacitor plate, enclosing the concave surface with a sensing diaphragm sealed to said one housing section, said sensing diaphragm forming a second capacitor plate, providing a second chamber closed by a second diaphragm on said one section, providing fluid passage means between the area enclosed between the concave surface and the sensing diaphragm and said second chamber, filling said second chamber, said fluid passage means and the area enclosed by said sensing diaphragm with fluid to transmit pressure on said second diaphragm to said sensing diaphragm.

4. A method of making a differential capacitive pressure transducer having a sensing cell of the capacitive type and an outer housing forming a pair of pressure chambers, including the steps of providing two sensing cell sections, each of said cell sections having a first chamber defined in one surface thereof, a spaced second chamber and fluid passage means extending between said first and second chambers of each cell section, placing a sensing diaphragm between said cell sections to close both of said first chambers, closing each of said second chambers with second diaphragms, filling said first and second chambers and said fluid passage means on each cell section with fluid to transmit pressure on said second diaphragm to said sensing diaphragm, providing a wall member, clamping said sensing cell sections together against said wall member so that said sensing diaphragm is clamped at a first clamping stress level, and clamping said outer housing to support portions of said wall member other than those clamping the sensing cell sections to mechanically support said outer housing on the support portions at a desired clamping force before the outer housing is pressed against said cell sections to thereby support said outer housing without substantially changing the clamping stress on said diaphragm.

* * * * *